(12) United States Patent
Kohli et al.

(10) Patent No.: US 10,819,575 B2
(45) Date of Patent: Oct. 27, 2020

(54) SYSTEM AND METHOD OF CONFIGURING NETWORK ELEMENTS

(71) Applicant: Arista Networks, Inc., Santa Clara, CA (US)

(72) Inventors: Ashwin Kohli, Santa Clara, CA (US); Jia Ru Chen, Santa Clara, CA (US); Jody Scott, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 282 days.

(21) Appl. No.: 15/175,954

(22) Filed: Jun. 7, 2016

(65) Prior Publication Data

US 2017/0250867 A1  Aug. 31, 2017

Related U.S. Application Data

(60) Provisional application No. 62/300,713, filed on Feb. 26, 2016.

(51) Int. Cl.
*H04L 12/24* (2006.01)

(52) U.S. Cl.
CPC ...... *H04L 41/0893* (2013.01); *H04L 41/0813* (2013.01); *H04L 41/0886* (2013.01); *H04L 41/022* (2013.01)

(58) Field of Classification Search
CPC ............. H04L 41/0893; H04L 41/0813; H04L 41/0886; H04L 41/022
See application file for complete search history.

(56) References Cited

U.S. PATENT DOCUMENTS 9,559,897 B2 * 1/2017 Lin ..................... H04L 41/0803
2007/0067351 A1 * 3/2007 Singh ................ G06F 17/30286

* cited by examiner

*Primary Examiner* — Kim T Nguyen
(74) *Attorney, Agent, or Firm* — Haley Guiliano LLP

(57) ABSTRACT

A method and apparatus to configure a plurality of network elements is described. In an exemplary embodiment, an automation controller receives a plurality of labels for the plurality of network elements. Each of the plurality of labels is associated with a different configlet and each of the different configlets includes a configuration command. The automation controller further assembles the plurality of configlets into separate configurations corresponding to each of the plurality of network elements. In addition, the automation controller configures each of the plurality of network elements using the separate configuration corresponding to that network element.

15 Claims, 11 Drawing Sheets

400

Static (402):
    ip name-server 1.1.1.1
    ntp server 2.2.2.2

Scriptable (404):
```
#!/bin/python
config+="ip name-server 1.1.1.1\n"
config+="ntp server 2.2.2.2\n"
def getConfig(PreDeterminedType=None):
  return config
```

Template (406):
    ip name-server $GLOBAL_NAME_SERVER
    ntp server $GLOBAL_NTP_SERVER

SYSTEM AND METHOD OF CONFIGURING NETWORK ELEMENTS

RELATED APPLICATIONS

Applicant claims the benefit of priority of prior, provisional application Ser. No. 62/300,713, filed Feb. 26, 2016, the entirety of which is incorporated by reference.

FIELD OF INVENTION

This invention relates generally to data networking, and more particularly, to perform a configuring network element using user-defined chunks.

BACKGROUND OF THE INVENTION

An enterprise may have multiple data centers that are used to support operations of the enterprise. For example, the enterprise may use a data center for e-commerce, online transactions, database transactions, enterprise resource planning, and/or various other types of operations of the enterprise. In one embodiment, a data center is a facility used to house computer systems, networking equipment, storage system, and/or other types of equipment for an enterprise. Each of the data centers can house up to thousands of devices, where each of the devices can be a computer system, networking equipment, storage system, or some other type of device used in a data center.

However, managing the tens of thousands of devices (or more) that are located in these multiple data centers can be difficult because of the shear numbers of devices to configure. Traditional network management platforms are developed to be vendor agnostic with context inserted by the user. These systems do not work out of the box and require extensive initial customization and ongoing resources as vendor interfaces change. These systems generally can only take advantage of a complex vendor feature if the feature is widely available from multiple vendors.

SUMMARY OF THE DESCRIPTION

A method and apparatus to configure a plurality of network elements is described. In an exemplary embodiment, an automation controller receives a plurality of labels for the plurality of network elements. Each of the plurality of labels is associated with a different configlet and each of the different configlets includes a configuration command. The automation controller further assembles the plurality of configlets into separate configurations corresponding to each of the plurality of network elements. In addition, the automation controller configures each of the plurality of network elements using the separate configuration corresponding to that network element.

In another embodiment, the automation controller receives a dynamic label for network element, where the dynamic label is assigned to the network element based on at least a current configuration of the network element without user intervention. The automation controller further assembles a configuration from a configlet associated with dynamic label, where the configlet includes a configuration command.

In a further embodiment, the automation controller receives a plurality of labels and configlets for a network element. The automation controller further assembles a configlet configuration for the network element from the plurality of configlets. The automation additionally retrieves a running configuration from the network element. In addition, the automation controller presents the plurality of labels and configlets in a first panel of a user interface, the configlet configuration in a second panel, and the running configuration in a third panel. Furthermore, the automation controller configures the network element using the configlet configuration.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
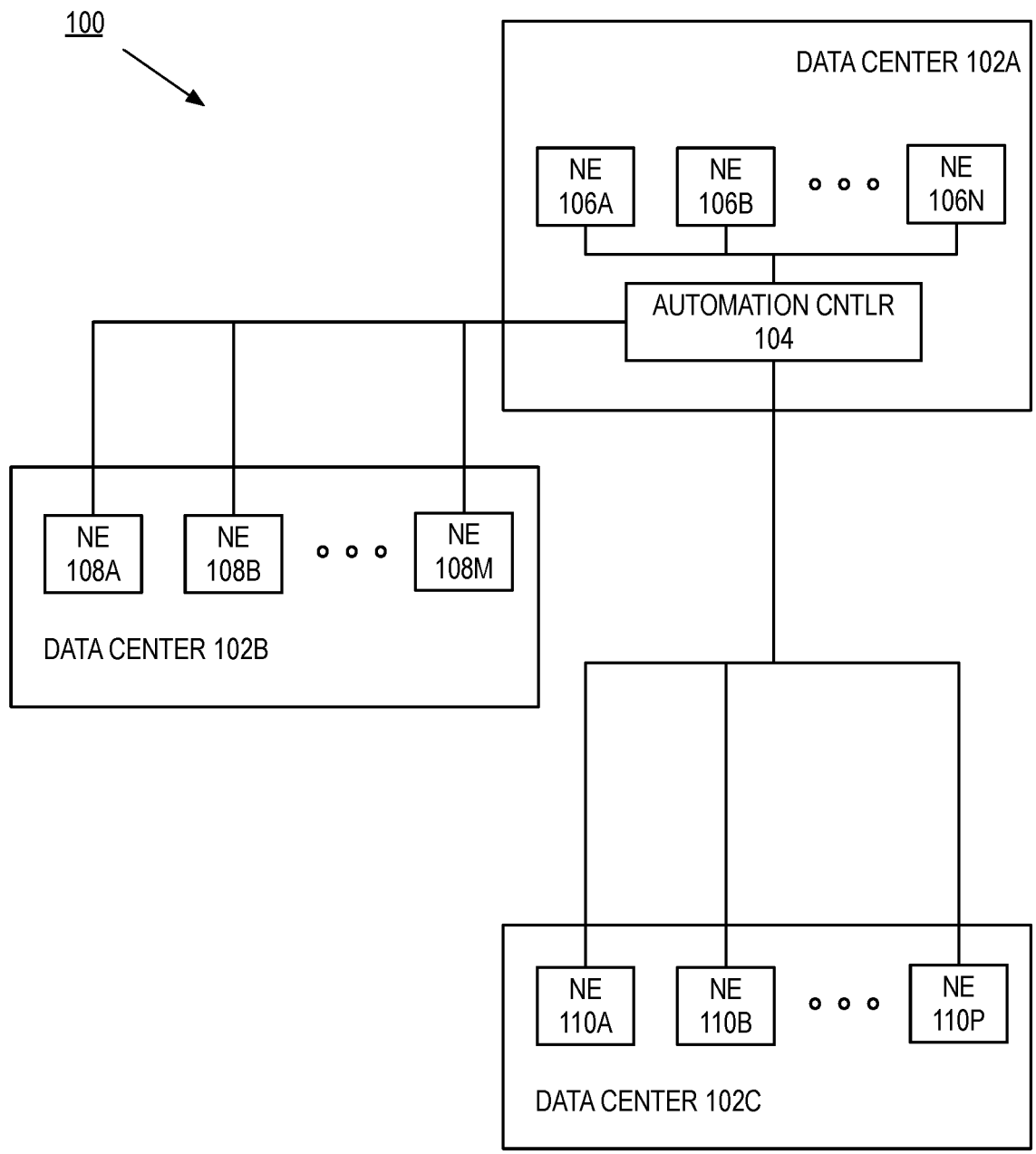
FIG. 1 is a block diagram of one embodiment of a network of multiple data centers of an enterprise, where each of the network elements in the data centers is coupled to an automation controller.

A method and apparatus to configure a plurality of network elements is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus to configure a plurality of network elements is described. Traditional network management platforms are developed to be vendor agnostic with context inserted by the user. These systems, however, do not work out of the box and require extensive initial customization and ongoing resources as vendor interfaces change. In addition, these systems generally can only take advantage of a complex vendor feature if the feature is widely available from multiple vendors. Traditionally, data networks have provided a management interface per switch. Each switch is then managed individually and the end user must address any differences between software revisions or hardware implementations.

In one embodiment, an automation controller is described that is context aware and able to better utilize switch implementations. In one embodiment, automation controller is context aware because this automation controller has access to data that other system may not have (e.g., the automation controller is produced by the same entity that develop the network element(s) that automation controller manages. The automation controller further provides a unified single interface to manage network of network elements in one or more data centers. This interface allows the user to manage the network with a modern graphical user interface, a representational state transfer (REST) interface, conventional command line interface (CLI) and/or any combination thereof. The automation controller additionally centralizes configuration and management into headless cluster but does not centralize the control plane of each network element. Each network element remains "smart" and capable of being directly managed via existing industry standard protocols. The automation controller provides network configuration and software image management but the automation controller is not necessarily a replacement for a centralized configuration management system. In one embodiment, the automation controller exposes a REST interface, which can be used by traditional network management platforms to manage individual network elements. This allows a user to only have one interface to manage the network elements (as opposed to number of network elements). The user is free to use their preferred tool to push configurations and use the automation for types of functionality such as troubleshooting, network telemetry, network rollback/roll-forward, capacity planning and others.

The automation controller includes the ability to operate at large scale (e.g., cloud scale) by leveraging software to multiply an engineer's ability to perform their job duties. Traditionally, a network engineer would develop a good view of their network after working with network day after day for a period of time. The engineer would understand where certain hardware platforms were deployed, what network elements were running what code, and what the general configuration was for any given network element. The human mind can handle this for one hundred network elements, but is extremely difficult for ten thousand network elements. What is needed is a way to view the network at this scale.

The traditional structure for classification is hierarchy. A logical hierarchy structure is geographical location. Network elements located in the same pod can be placed in the same pod container. These pod containers can be placed in datacenter containers. The problem with hierarchy is that it imposes a view that only aligns with the needs of the engineer when the engineer needs are localized such as the need to observe or change network elements in a given container. If the engineer need to observe network elements that are not in the same container, the engineer must travel up the hierarchy until arrives at a common parent. This can result in lots of unnecessary clutter and can lead to unforeseen errors.

In one embodiment, the automation controller uses labels to organize and configure the network elements in the difference data centers. In one embodiment, a label is an identifier associated with one or more the network elements. Multiple network elements can share the same label, or a label can be unique for a network element. Labels can be used to emulate a hierarchy when certain rules are abided, but this hierarchy is not limited to a geographical hierarchy. Network elements can be assigned any number of labels according to the label rules. For instance, a label can be assigned based on hardware platform, software version, configuration, location or any another type of logic. With labels, an engineer can now rapidly dissect this large network. In one embodiment, an engineer could look at network element in a geographical location with the same platform type and configuration. Alternatively, the engineer can view the network elements by the functional relationship of these network elements. In a further embodiment the engineer using a different type of hierarchical relationship or a combination geographical, functional, or another type of relationship. Not only can the engineer view network elements in this manner, the engineer can act on them and perform configuration changes or software upgrades. In one embodiment, a hierarchical label that contains one or network element is called a "Container". The hierarchical is a logical grouping of network elements that are closely related most likely they are located proximately.

In one embodiment, operating at Cloud Scale can mean using "cookie cutter" configuration for sets of similarly functioning network elements using "configlets". In this embodiment, configlets are subsets of configuration text derived from static entry, scripts or templates. Configlets can be associated to a network element or a label. A network element configuration is the derived aggregation of all the configlets either attached to the network element directly or to a label that is attached to the network element. From a hierarchal perspective, a network element will inherit the configlets assigned to its ancestors. A change to a configlet will result in a change to a network elements compliant configuration.

In one embodiment, a label can be a static, dynamic, hierarchical, or custom label. A static label is based on its platform type and any cards, modules or optics. Changes to hardware affect label assignment but changes to software do not. Static labels cover the switch platform and any electrical object that can be inserted or removed from the switch. A dynamic label is based on the software configuration of a network element. For instance, if the network element is configured as "tapagg" the network element receives a matching label. If the network element is part of a MLAG pair, each network element can receive a label unique to that MLAG pair. Alternatively, network elements that are part of an MLAG pair or in an MLAG can receive the MLAG dynamic label. Other dynamic labels cover spines, leafs and any future need. In one embodiment, a dynamic label can be assigned to network element without the intervention of a user.

A hierarchical label is based on hierarchy. Hierarchy labels are special in that they have a single parent and may have zero or more children. A network element can have multiple hierarchy labels permitting the hierarchy labels as ancestors or descendants of each other. That a network element can only be in one place at a time is inferred from the preceding rules. In one embodiment, hierarchy labels can be organized geographically (e.g., US, Europe, or other type of geographical label), can be organized functionally (e.g., leaf, leaf1, leaf2; spine, spine 1, spine2), or some other type of organization. A hierarchical label that contains one or more labels is called a "Container." A custom label can be based on any logic not applicable to the preceding label types and can be defined by a network element manufacturer or the end user.

In one embodiment, network configuration can be fairly homogenous, in that network element that are similar types of topology are configured similarly. For instance, a network engineer will decide where a networks network element it to be located. The network engineer will assemble the configuration from template files such as a global file, a localized file and then any per device configuration obtained from other sources. Configlets are configuration settings that when aggregated together form a complete (or near complete) network element configuration. Configlets can be composed of logical groupings of configurations, such as topology type configurations (e.g., leaf, spine, multi-chassis link aggregation (MLAG), tapagg, and/or other types of topology configurations).

In one embodiment, there are three different types of configlets: static, scriptable and "templateable." Static are self-defining configlets. Scriptable configlets are scripts that will be executed at configuration build time with a predetermined data type. The returned value is used to populate a configlet. "Templateable" configlets are configuration with special patterns that will be copied at configuration build time and the special patterns will be replaced with the appropriate value.

FIG. 1 is a block diagram of one embodiment of a network of multiple data centers of an enterprise, where each of the network elements in the data centers is coupled to an automation controller. In FIG. 1, network 100 includes data centers 102A-C that are coupled together via a data communications network (not illustrated). In one embodiment, a data center is a facility used to house computer systems, networking equipment, storage system, and/or other types of equipment for an enterprise. Each of the data centers 102A-C can house up to thousands of network elements. In one embodiment, each of the network elements is coupled to the data communications network and can be managed by a management device. Each of the data centers 102A-C may be located in a separate region that is geographically remote from the other data centers 102A-C. For example and in one embodiment, each of the data centers 102A-C may be located in a different region in a country, such as data center 102A may be in San Francisco, data center 102B may be in Dallas, and data center 102C may be in New York. In another embodiment, each of the data centers 102A-C may be located in different countries and/or continents, for example, data center 102A may be located in the United States, data center 102B may be located in China, and data center 102C may be located in Europe. While in one embodiment, network 100 is illustrated with 3 data centers 102A-C, in alternative embodiments, network 100 may have more or less data centers.

In one embodiment, it can be difficult to manage the possibly tens of thousands of network elements (or more) that are located in these multiple data centers 102A-C. One way of managing the network elements in the data centers 102A-C is for each data center 102A-C to have a network management station (NMS) that is used to manage the devices in the data center that includes the NMS. Typically, an NMS manages each of the devices in the data center using the Simple Network Management Protocol (SNMP). An SNMP-based NMS, however, does not scale well when the number of network elements in that data center approaches 5000 or more network elements. Moreover, by having an NMS in each of the data centers 102A-C, it is hard for administrator to get an overall picture of the performance and function of the data centers 102A-C in network 100. This is because there is not a straightforward way to automatically compile the data in each of the NMSes to give the overall network picture.

An alternative way to manage the devices in the data centers 102A-C is to manage each of the devices using a cloud-based service. In this embodiment, there is not an NMS physically residing in the data center. Instead, the cloud-based service is coupled to the network elements in each of the data centers 102A-C and manages each of those devices. This can be a problem for an enterprise because the cloud-based service has access to all of the data center operating data as this operating data is not stored on a device that resides in one of the data centers 102A-C. The enterprise may not want to expose this operating data to a device outside of the data center for security reasons. Furthermore, the enterprise may be constrained by custom or regional laws as to allowing cloud-based management. Constraints that discourage the enterprise from using a cloud-based service to manage the devices and the data centers 102A-C.

As illustrated in FIG. 1, and in one embodiment, network 100 includes an automation controller 104 to manage the data center network elements and to automate tasks that are used to manage those devices in the data center 102A-C. In one embodiment, each of the data centers 102A-C can include hundreds or thousands of network elements. For example and in one embodiment, data center 102A includes network elements 106A-N, data center 102B includes network elements 108A-N, and data center 102C includes network elements 110A-N. Data centers 102A-C can include differing numbers of devices in each of these data centers. In one embodiment, each of the network elements 108A-N (or 110A-N, 112A-N) can be can be a switch, router, hub, bridge, gateway, etc., or any type of device that can allow access to a network. In one embodiment, the network element can be a virtual machine. Alternatively, the data centers 102A-C can includes other devices that are computer systems, storage devices, or another type of device that is managed by a network connection. In one embodiment, a computer system can be a personal computer, laptop, server, mobile device (e.g., smartphone, laptop, personal digital assistant, music playing device, gaming device, etc.), and/or any device capable of executing a process. In one embodiment, any of the devices 108A-N (or 110A-N, 112A-N) can be a virtual machine or can be a device that hosts one or more virtual machines. In one embodiment, a storage system can be a device capable of providing storage for other devices (e.g., server, networked storage device, distributed storage, redundant storage, and/or another type of device being capable of providing storage for another device).

In one embodiment, the network elements in these data centers 102A-C are managed using an automation controller 104. In one embodiment, the automation controller 104 can be a computer system, a network element, or another type of device that can be used to manage the network elements in the data centers.

In one embodiment, the automation controller includes the ability to operate at large scale (e.g., cloud scale) by leveraging software to multiply an engineer's ability to perform their job duties. In one embodiment, the automation controller uses labels to organize and configures the network elements in the difference data centers 102A-C. In one embodiment, a label is an identifier associated with one or more the network elements. Multiple network elements can share the same label, or a label can be unique for a network element. Labels can be used to emulate hierarchy when certain rules are abided. Network elements can be assigned any number of labels according only to the labels rules. For instance, the network engineer can assign a label based on hardware platform, software version, configuration, location or any other logic that we can imagine. With labels the network engineer can now rapidly dissect our network. The network engineer could look at network elements only in a geographical location with the same platform type and configuration. Not only can we view network elements in this manner, we can act on them and perform configuration changes or software upgrades. A hierarchical label that contains one or network elements is called a "Container". This is a logical grouping of network elements that are closely related most likely they are located proximately.

In one embodiment, there are different types of labels: static, dynamic, hierarchical, and custom. A static label is based on its platform type and any cards, modules or optics. In one embodiment, changes to hardware affect label assignment but changes to software do not. Static labels cover the switch platform and any electrical object that can be inserted or removed from the switch. A dynamic label is based on the software configuration of a network element. For instance, if the network element is configured as "tapagg" it receives a matching label. If the network element is part of a MLAG pair, each network element receives a label unique to that MLAG pair. Other dynamic labels cover spines, leafs and any future need. Dynamic labels are further described in FIG. 4 below.

A hierarchical label is based on hierarchy. Hierarchy labels are special in that these labels have a single parent and may have zero or more children. A network element can have multiple hierarchy labels permitting all hierarchy labels are ancestors or descendants of each other. That a network element can only be in one place at a time is inferred from the preceding rules. Hierarchy could geographical. A hierarchical label that contains one or network elements is called a "Container". Hierarchical labels are further described in FIG. 2 below. A custom label is based on any logic not applicable to the preceding label types and can be defined by network element manufacturer or the end user.

Figure 2:
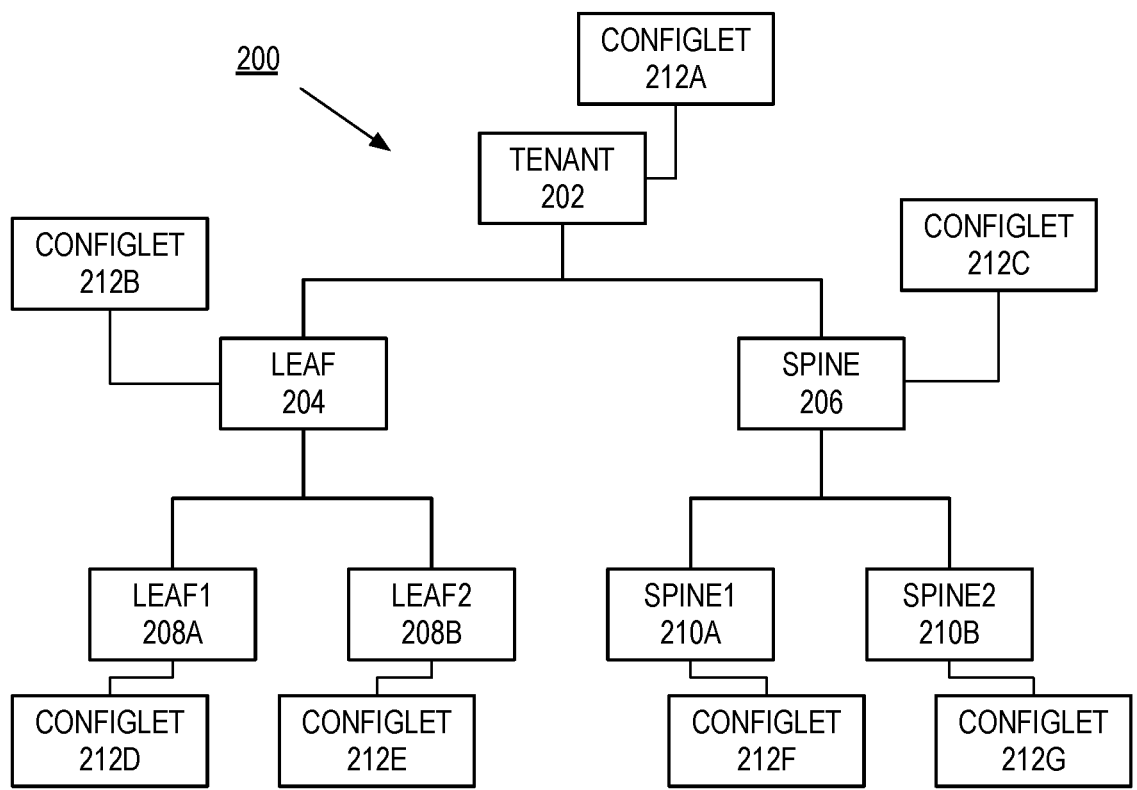
FIG. 2 is a block diagram of one embodiment of a hierarchical system of labels for network elements.

FIG. 2 is a block diagram of one embodiment of a hierarchy 200 of labels for network elements. In FIG. 2, the labels 202-210B are organized into a hierarchy 200 of the labels, with a tenant 202 label as the top label. As illustrated, the tenant label 200 is a container for the leaf label 204 and spine label 206. Furthermore, the leaf label 204 is a container for the leaf1 label 208A and leaf2 label 208B, and the spine label 206 is a container for the spine1 label 210A and spine2 label 210B. In one embodiment, each of the labels (including container label) has an attribute that is a configlet (e.g., configlets 212A-G). As discussed above, a configlet is a set of configuration settings that when aggregated together with other configlets form a complete network element configuration. In one embodiment, each configlet includes at least one configuration command.

In one embodiment, the tenant label 202 can have an associated configlet 212A that is used to set policy for any network elements that has one of the labels in the label hierarchy 200. For example and in one embodiment, the configlet 212A can set a policy for a global name server or timeserver that is used for the network elements with a label in the hierarchy 200. The tenant label 202 has two children labels, the leaf label 204 and the spine label 206. In one embodiment, the leaf label 204 is used for any network elements used in a leaf topology, such as a top of the rack switch that provides network access for a rack of servers. In this embodiment, the leaf network elements would get this label (or one of the children leaf labels) and have the configlet associated with leaf label 204 as part of the configuration for these network elements. For example and in one embodiment, the configlet 212B can set a policy that is used for the leaf network elements across the different data centers. For example and in one embodiment, a example configlet for a general leaf network element can be:

```
hostname leaf10
username admin privilege 15 role network-admin secret arista
ip name-server 172.16.0.4
ntp server 172.16.0.4
ip domain-name arista.test
ip routing
interface loopback0
ip address 172.16.0.15/32
!
interface Management1
ip address 192.168.0.15/16
!
interface Ethernet1
description [Spine S1]
no switchport
ip address 172.16.2.5/31
!
interface Ethernet2
description [Spine S2]
no switchport
ip address 172.16.2.21/31
!
interface Ethernet3
description [Spine S3]
no switchport
ip address 172.16.2.37/31
!
interface Ethernet4
description [Spine S4]
no switchport
ip address 172.16.2.53/31
!
```

```
!
router bgp 64515
  redistribute connected
  redistribute static
  neighbor 172.16.2.4 remote-as 64512
  neighbor 172.16.2.20 remote-as 64512
  neighbor 172.16.2.36 remote-as 64512
  neighbor 172.16.2.52 remote-as 64512
!
end
```

In this example, the configlet for leaf network element "leaf0" includes configuration commands for setting a nameserver, a network time protocol server, and setting different interface values for interfaces coupled to spine network elements. In addition, this configlet further includes configuration parameters that define Border Gateway Protocol (BGP) configuration and neighbors.

Because there can many different network elements used as leaf network elements in the different data centers (e.g., data centers 102A-C in FIG. 1) with different characteristics that may have configurational requirements (e.g., different network element models, network elements in different regions or countries with local networking policies or other requirements, departmental, and/or other types of configurational differences), there can be additional labels for leaf configurations with further refinements. In one embodiment, there can be one or more leaf child labels that are used to further add configuration elements, such as the leaf1 label 208A and the leaf1 label 208B. In this embodiment, these additional leaf labels can be used for to further add configurational elements for different leaf topology situations. For example and in one embodiment, the leaf1 label 208A and leaf2 label 208B can be used for leaf network elements in different regions that have different regional requirements. Alternatively, the different leaf labels 208A-B can be used for network elements with different customers or different types of server racks. Consider a customer with three different rack designs (or builds) one for a traditional compute server rack, one for a "Big Data" server rack, and one for network storage server rack. The customer may want to apply a specific quality of service (QOS) policy to each rack. The customer could create three labels (DefaultQOS, BigDataQOS, and IPStorageQOS) and apply them as necessary. If the customer determines that the BigDataQOS policy required modification, the customer could do so in one place.

In this embodiment, configlet 212D would be applied to network elements with the leaf1 label 208A and configlet 212E would be applied to network elements with the leaf2 label 208B. This embodiment allows the network administrator to assign roles to the different leaf network elements without having to keep track of what configurations are needed for each network elements. This further reduces the changes of a misconfiguration error.

In one embodiment, the spine label 206 is used for any network elements used in a spine topology, such as a top of the rack switch that provides network access for a rack of servers. In this embodiment, the spine network elements would get this label (or one of the children spine labels) and have the configlet associated with spine label 206 as part of the configuration for these network elements. For example and in one embodiment, the configlet 212C can set a policy that is used for the spine network elements across the different data centers.

Because there can many different network elements used as spine network elements in the different data centers (e.g., data centers 102A-C in FIG. 1) with different characteristics that may have configurational requirements (e.g., different network element models, network elements in different regions or countries with local networking policies or other requirements, departmental, and/or other types of configurational differences), there can be additional labels for leaf configurations with further refinements. In one embodiment, there can be one or more spine child labels that are used to further add configuration elements, such as the spine1 label 210A and the spine1 label 210B. In this embodiment, these additional spine labels can be used for to further add configurational elements for different spine topology situations. For example and in one embodiment, the spine1 label 210A and spine2 label 210B can be used for spine network elements in different regions that have different regional requirements. Alternatively, the different spine labels 210A-B can be used for network elements with different customers or different types of leaf topologies. In this embodiment, configlet 212F would be applied to network elements with the spine1 label 210A and configlet 212G would be applied to network elements with the spine2 label 210B. This embodiment allows the network administrator to assign roles to the different spine network elements without having to keep track of what configurations are needed for each network elements. As with the different leaf labels discussed above, the use different spine labels reduces the changes of a misconfiguration error.

Figure 3:
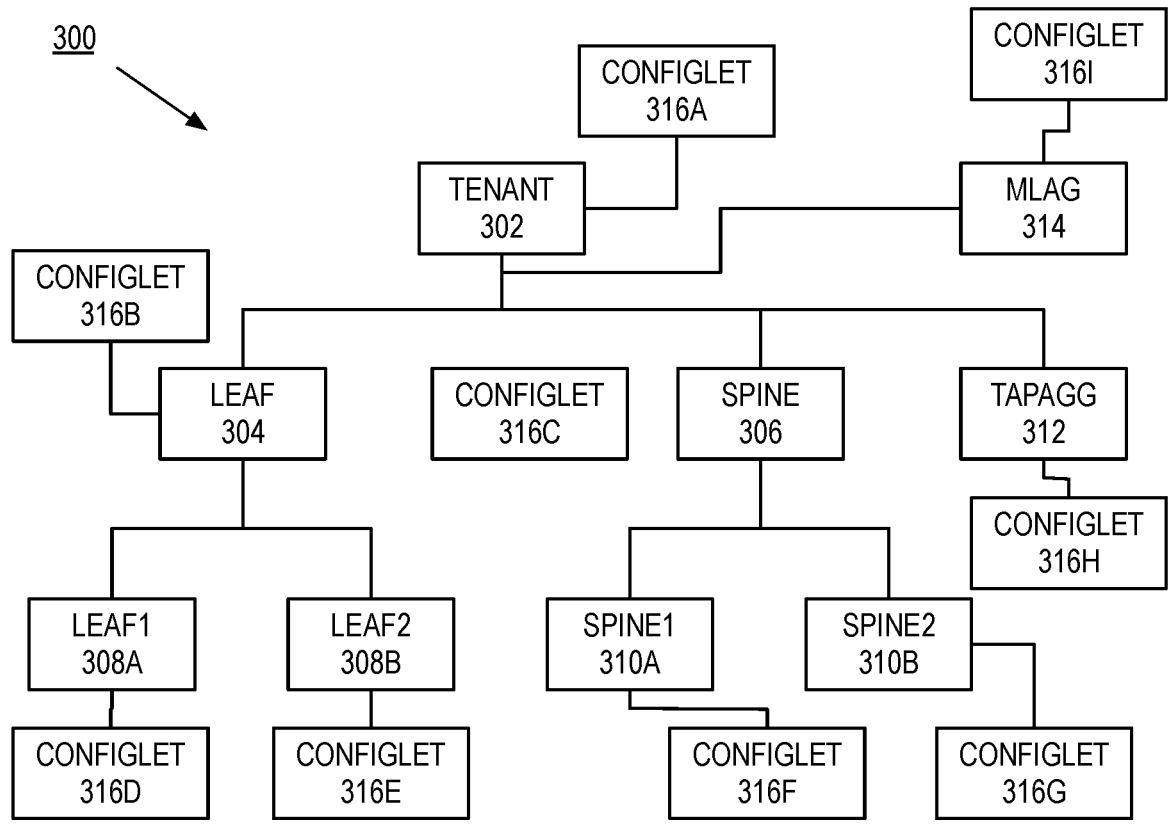
FIG. 3 is a block diagram of one embodiment of a hierarchical system of labels for network elements that include dynamic labels.

As described in relation to FIG. 2, hierarchical labels can have multiple labels and configlets for network elements. There are different types of labels, such as dynamic labels. A dynamic label is based on the software configuration of a network element. For instance, if the network element is configured as "tapagg" it receives a matching label. If the network element is part of a MLAG pair, each network element receives a label unique to that MLAG pair. Other dynamic labels cover spines, leafs and any other type of future need. FIG. 3 is a block diagram of one embodiment of a hierarchical system of labels 300 for network elements that include dynamic labels. In FIG. 3, the hierarchy 300 includes labels as described in FIG. 2 above: tenant label 302, leaf label 304, spine label 306, leaf1 label 308A, leaf2 label 308B, spine1 label 310A, and spine2 label 310B. In addition, the tenant label 302 is the root label in the hierarchy 300 and a container for the leaf label 304 and spine label 306 being child labels of the tenant label 302. Furthermore, the leaf label 304 is a container for the leaf1 label 308A and leaf2 label 308B, and the spine label 306 is a container for the spine1 label 310A and spine2 label 310B. Furthermore, each of these labels has an associated configlet 316A-G.

In addition to the labels 302-310B, the hierarchy includes labels for MLAG 314 and Tapagg 312. In one embodiment, these labels 312 and 314 are dynamic labels that are automatically assigned to various network elements based on the configuration of those network elements. For example and in on embodiment, if the automation controller detects that a network element (or multiple network elements) are configured in an MLAG configuration, the MLAG label is assigned to this network element. In one embodiment, the configlet to that MLAG network element or can be a general MLAG configuration used for some or all network elements in an MLAG. By assigning the MLAG label 314 to these network element(s), additional configuration or policy can be automatically applied to these network element(s) in the MLAG environment by an associated configlet 316I. In one embodiment, to setup one or more network elements for an MLAG, the network administrator would need to configure these network elements enough so that the automation controller can detect that these network element(s) are configured for an MLAG. The automation controller would detect this configuration and assign the MLAG label to those network element(s) in this MLAG environment. For example and in one embodiment, this configlet can be used in an MLAG environment:

```
switch1(conf)#int vlan 4094
switch1(config-if-Vl4094)# ip address 10.0.0.1/30
switch1(config)#mlag
switch1(config-mlag)#local-interface vlan 4094
switch1(config-mlag)#peer-address 10.0.0.2
switch1(config-mlag)#peer-link port-channel 10
switch1(config-mlag)#domain-id mlag1
switch2(conf)#int vlan 4094
switch2(config-if-Vl4094)# ip address 10.0.0.2/30
switch2(config)#mlag
switch2(config-mlag)#local-interface vlan 4094
switch2(config-mlag)#peer-address 10.0.0.1
switch2(config-mlag)#peer-link port-channel 10
switch2(config-mlag)#domain-id mlag1
```

In this example, the MLAG configlet sets various MLAG configuration parameters, such an internal VLAN and MLAG peer information. In one embodiment, an MLAG environment can be discovered based applying this configlet to one of the peers in the MLAG environment and the other peers are discovered as this MLAG relationship begins to form. In another embodiment, the MLAG environment can be discovered using a discovery protocol (e.g., Link Layer Discovery Protocol (LLDP) and/or another type of discovery protocol).

As another example and embodiment, the tapagg dynamic label 312 can be assigned for network elements that in a tap aggregation environment. In this example, a network element that is a tap aggregator has the ability to direct, or steer, traffic away from the aggregation group that the Tap port belongs to. This capability allows for a more granular focus and control on individual, or multiple, traffic flows ingressing the Tap Aggregator. If the automation controller detects that a network element (or multiple network elements) are configured in a tap aggregation configuration, the Tapagg label is assigned to this network element. By assigning the tapagg label 312 to these network element(s), additional configuration or policy can be automatically applied to these network element(s) in the tapagg environment by an associated configlet 316H. In one embodiment, to setup one or more network elements for a tapagg, the network administrator would need to configure these network elements enough so that the automation controller can detect that these network element(s) are configured for as a tap aggregator. The automation controller would detect this configuration and assign the tapagg label 312 to those network element(s) in this tap aggregation environment. For example and in one embodiment, this can be a tapagg configlet:

```
tap aggregation
mode exclusive
```

Other dynamic labels cover spines, leafs and any future need. For example and in one embodiment, the automation controller can automatically discover characteristics of each network element and creates labels for these characteristics (e.g., network model and model number, firmware level, and/or other types of network element characteristics).

Figure 4:
FIG. 4 is an illustration of differing types of configlets.

In the discussion above, different types of labels (static, hierarchical, dynamic, and custom) are used for different types of network element configurations. Each of these labels has an associated configlet that is used to apply one or more configuration commands or policies to a corresponding network element. In addition, there can be different types of configlets, such as a static configlet, a scriptable configlet, and a template configlet. FIG. 4 is an illustration of differing types of configlets. As described above, network configuration can be homogenous where there are basic types of network element functionalities (e.g., leaf network element, spine network elements, edge router, core routers, access points, and/or another type of network element). For instance, a network engineer will decide where a networks network element it to be located. They will then assemble the configuration from template files such as a global file, a localized file and then any per device configuration obtained from other sources. Configlets are configuration settings that when aggregated together form a complete network element configuration. Configlets can be composed of logical groupings of configuration.

In one embodiment, there are three different types of configlets: Static, Scriptable and "Templateable". In this embodiment, a static configlet is self-defining and includes static confirmation commands to a configuration without variables or scripting commands. As illustrated in FIG. 4, the static configlet 402 include the configuration command "ip name-server 1.1.1.1" that defines the name-server for network elements at address 1.1.1.1. In addition, the static configlet 402 include the configuration command "ntp server 2.2.2.2", which define the ntp server at the address 2.2.2.2.

In this embodiment, scriptable configlets are scripts that will be executed at configuration build time with a predetermined data type. The returned value of the executed script is used to populate a configlet. For example and in one embodiment, the scriptable configlet 404 is a Python script that when run, returns the configuration commands of "ip name-server 1.1.1.1" and "ntp server 2.2.2.2." In one embodiment, by using a scriptable configlet, runtime information can be integrated into the results of the scriptable configlet. While in one embodiment, a python script is illustrated as being used for a scriptable configlet, in alternate embodiments, any other type of scripting or executable language can be used for a scriptable configlet. In one embodiment, a scriptable configlet can be used to assign unique information to each network element (e.g., unique IP address(es) for each network element).

In another embodiment, "templateable" configlets are configuration with special patterns (e.g., variables) that will be copied at configuration build time and the special patterns will be replaced with the appropriate value. For example and in one embodiment, the templateable configlet 406 includes the commands "ip name-server $GLOBAL_NAME_SERVER" and "ntp $GLOBAL_NTP_SERVER." At configuration build time, the automation controller replaces the special patterns $GLOBAL_NAME_SERVER and $GLOBAL_NTP_SERVER with the values 1.1.1.1 and 2.2.2.2, respectfully to give the configuration commands "ip name-server 1.1.1.1" and "ntp server 2.2.2.2." In one embodiment, any of the types of configlets can be used for any of the types of labels.

Figure 5:
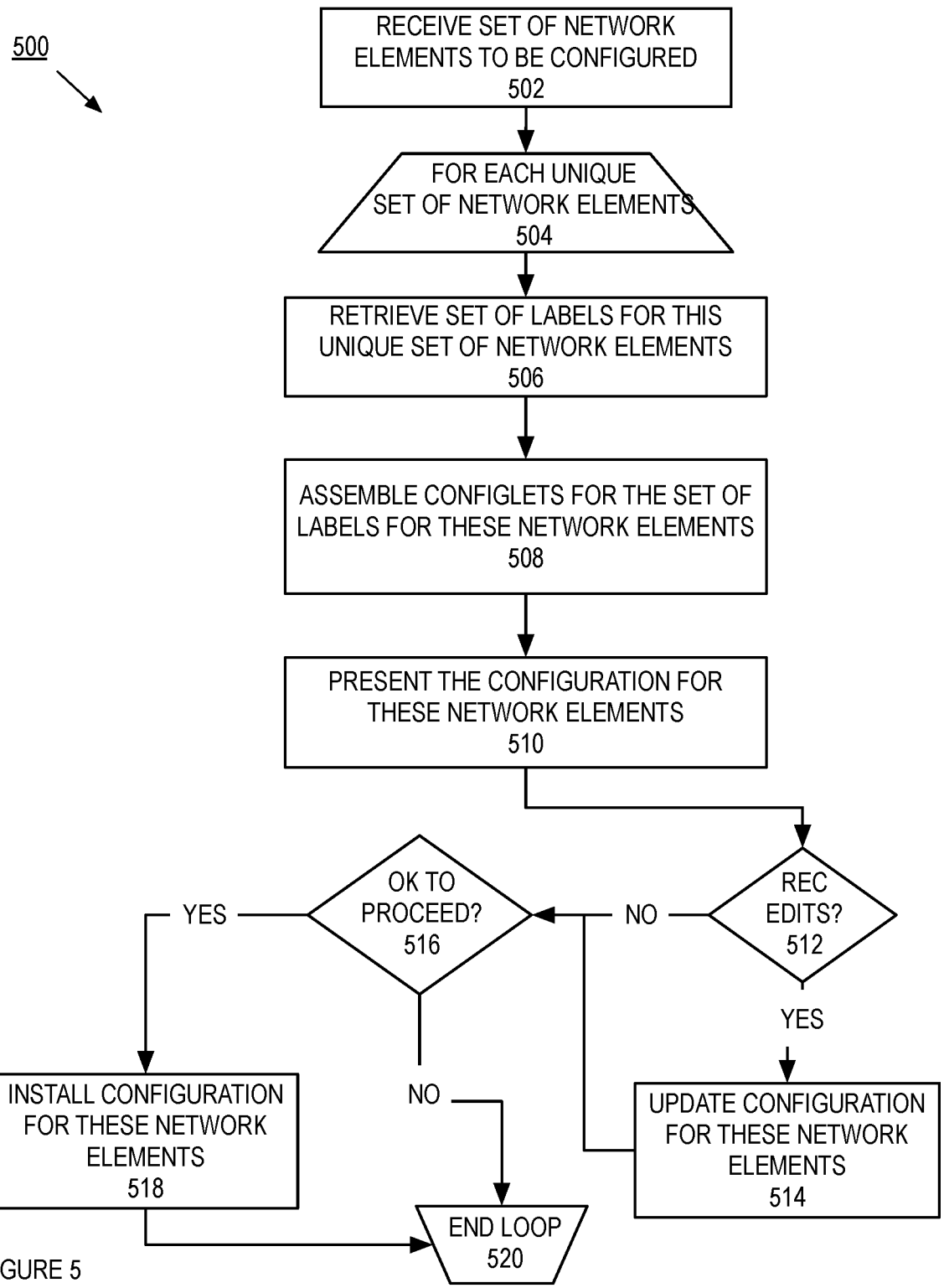
FIG. 5 is a flow diagram of one embodiment of a process to configure network elements using labels and configlets.

As discussed above, the automation controller processes the labels for network elements and assembles a configuration for those network elements using the configlets associated with these labels. FIG. 5 is a flow diagram of one embodiment of a process 500 to configure network elements using labels and configlets. In one embodiment, process 500 is performed by an automation controller, such as the automation controller 104 as described in FIG. 1 above. In FIG. 5, process 500 begins by receiving a set of network elements to be configured at block 502. In one embodiment, the set of network elements is the set of network elements known to the automation controller or can be a subset of network elements known to the automation controller. Furthermore, the network elements in the set can each have different sets of labels, the same set of labels, or a combination thereof. For example and in one embodiment, the set of network elements can include one subset of spine network elements with a spine1 hierarchical labels, another subset of network elements with an MLAG dynamic label and a model 5000 static label, and a further subset of network elements that have the leaf2 hierarchical label and the model 3000 label.

Process 500 further executes a processing loop (blocks 504-520) to generate a configuration for a set of similar network elements. In one embodiment, a set of similar network elements is one or more network elements that have similar functionalities, such as installed in a similar topology (e.g., leaf, spine, MLAG, or tapagg network elements), configured for similar functionality (e.g., edge or core forwarding) or have similar characteristics. At block 506, process 500 retrieves the set of labels for this set of network elements. Process 500 assembles the configlets from the unique set of labels for these network elements at block 508. In one embodiment, for each label, process 500 retrieves the configlet(s) associated with that label and adds these configlet(s) to a configuration these network elements. In one embodiment, for dynamic, static, or custom labels, process 500 retrieves the configlet associated with that label and adds the text in the configlet to the configuration for these network element(s). In another embodiment, for a hierarchical label, process 500 retrieves a configlet for this label and each parent label. Assembling the configlets for the labels of these network element(s) is further described in FIG. 6 below.

At block 510, process 500 presents the assembled configuration for these network element(s) to a user. In one embodiment, process 500 presents this assembled configuration so that the user can review and possibly adjust or edit this configuration. For example and in one embodiment, process 500 presents the assembled configuration along with the labels and an actual running configuration in a user interface as described in FIG. 8 below. Process 500 determines if process 500 has received any edits or changes to this presented configuration at block 512. In one embodiment, process 500 may receive edits as a result of a user editing the presented configuration. If there are no received edits, execution proceeds to block 516 below. If process 500 received edits, at block 514, process 500 updates the configuration using the received edits for these network element(s). Execution proceeds to block 516 below.

Process 500 determines if it is okay to proceed at block 516. In one embodiment, the user indicates to process 500 to proceed (e.g., by clicking on a configuration OK button or another way of indicating the configuration is okay to proceed). If it is not okay to proceed, execution proceeds to block 520 below. If it is okay to proceed, process 500 installs the configuration for these network elements at block 518. In one embodiment, process 500 sends the configuration to the target network element and reboots the network elements such that after a reboot, the network element is running with the new configuration. Alternatively, process 500 can sends the configuration to the target network element and the network element can install the new configuration with little or no impact on the functionality of this network element. The processing loop ends at block 520.

Figure 6:
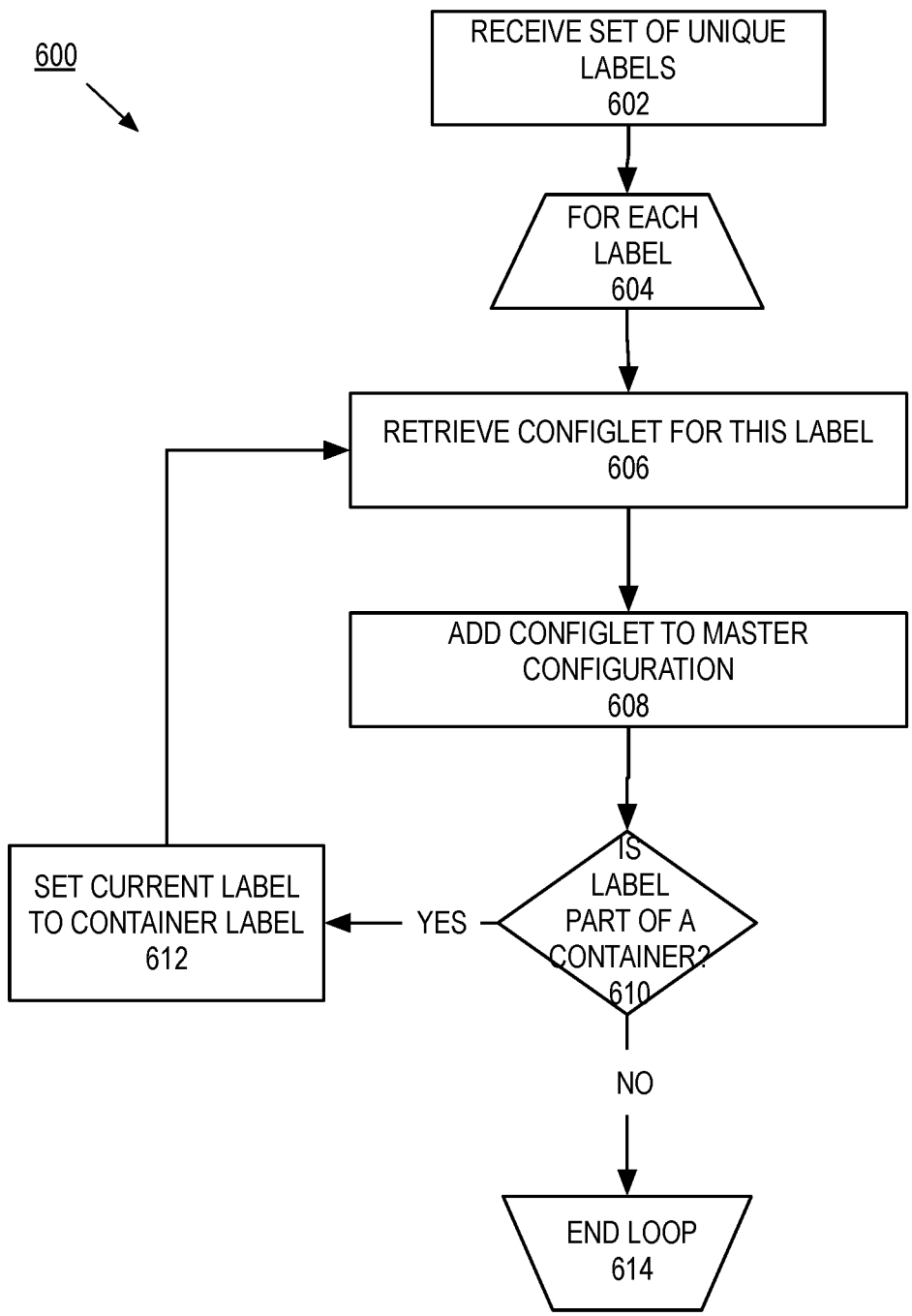
FIG. 6 is a flow diagram of one embodiment of a process to assemble a configuration from a set of labels and the configlets for each of those labels.

As per above, process 500 assembles the configuration for a network element from one or more configlets associated with the labels for that network element. FIG. 6 is a flow diagram of one embodiment of a process 600 to assemble a configuration from a set of labels and the configlets for each of those labels. In one embodiment, process 600 is performed by a process to assemble a configuration, such as process 500 as described in FIG. 5 at block 508 above. In FIG. 6, process 600 begins by receiving the set of labels for a set of network element(s) at block 602. Process 600 further performs a processing loop (blocks 604-614) to assemble the configuration for this set of labels. At block 606, process 600 retrieves that configlet for that label. In one embodiment, each of the labels can be a dynamic, static, custom, and/or hierarchical label. For example and in one embodiment, dynamic label can also be a hierarchical label if this dynamic label is part of a container. In one embodiment, each associated configlet can be one of a static, scriptable, or templateable configlet as described in FIG. 4 above.

At block 608, process 600 adds this configlet to the configuration. In one embodiment, if this configuration is empty, the configuration is started with this configlet. Alternatively, if the configuration includes another configuration command(s), process 600 adds this text from the configlet to the configuration. In one embodiment, process 600 can append, prepend, or otherwise insert the configlet text to the configuration. While in one embodiment, there can be no order of precedence for adding text form a configlet into a configuration, in alternate embodiment, some configlets may have order precedence. In these latter embodiments, an operator can review the order of the text and adjust accordingly. Process 600 determines if the label has a parent label or is part of a container. In one embodiment, the label may be part of a container, such as the leaf 1 or spine 2 labels as described in FIGS. 2 and 3 above. If the label is not part of a container, execution proceeds to block 614 below. If the label is part of a container, process 600 sets the current label to the container label at block 612. In one embodiment, by setting the current label to the container label, process 600 can process the container label and add the configlet associated with the container label to the configuration. Execution proceeds to block 606 above. The processing loop ends at block 614.

Figure 7:
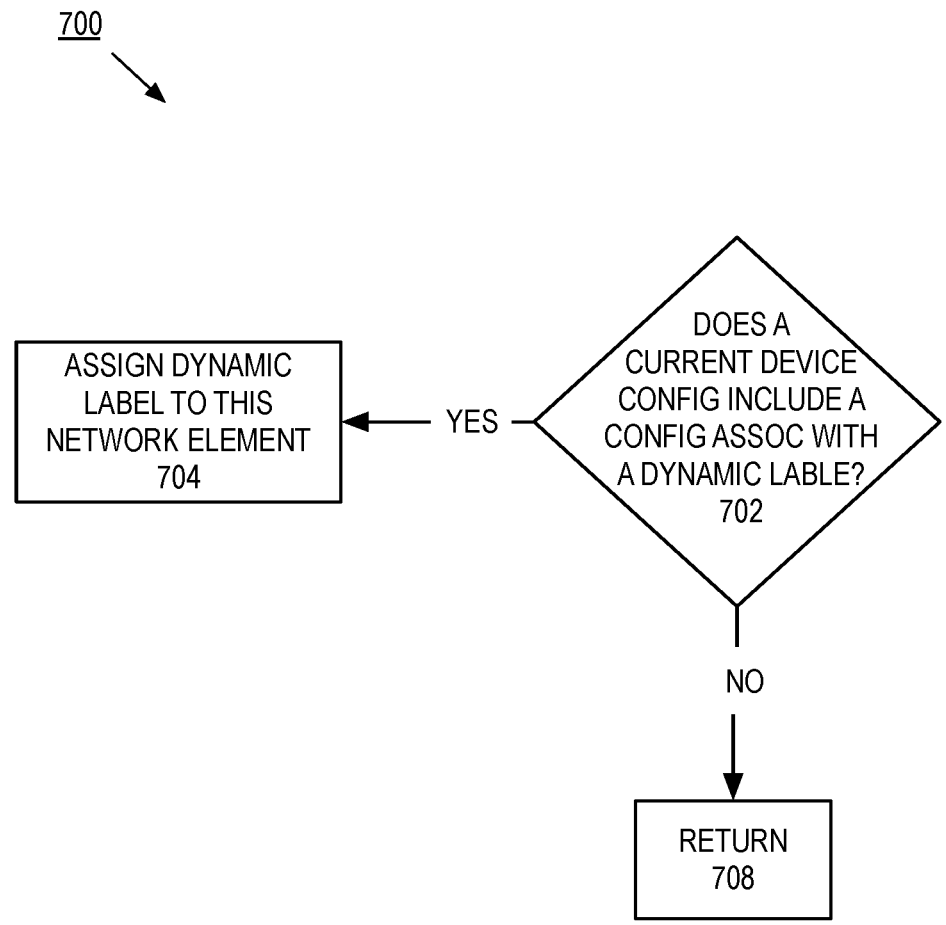
FIG. 7 is a flow diagram of one embodiment of a process to assign dynamic labels for a network element based on a current configuration that network element.

In one embodiment, the automation controller can examine the configuration of each network element known to the automation controller to determine if a dynamic label can be applied. FIG. 7 is a flow diagram of one embodiment of a process 700 to assign dynamic labels for a network element based on a current configuration that network element. In one embodiment, process 700 is performed by an automation controller, such as the automation controller 104 as described in FIG. 1 above. In FIG. 7, process 700 begins by determining if a network configuration for an element includes a configuration associated with a dynamic label at block 702. In one embodiment, process 700 examines the current configuration of a network element to determine if there are any indications that a dynamic label would apply to this network element. For example and in one embodiment, if process 700 detects that a network element is part of a MLAG pair, process 700 can apply the MLAG dynamic label to this network element. In this example, an MLAG configuration is two network element coupled together in a MLAG pair. Automated discovery of an MLAG pair can performed using a discovery protocol (e.g., LLDP or another type of discovery protocol). Thus, the MLAG configuration causes the MLAG peers to form and a show command identifies the peer and the label is applied. Alternatively, process 700 detects that a network element is in a tap aggregation environment, process 700 can apply the tapagg dynamic label to this network element. In one embodiment, process 700 uses a set of rules that indicate which dynamic labels occur in which type of configuration. If the network element includes a configuration associated with a dynamic label, process 700 assigns this dynamic label to this network element. In one embodiment, process 700 may assign more than one dynamic label to a network element. If the network element configuration does not have a dynamic label associated with this configuration, process 700 returns at block 708.

Figure 8:
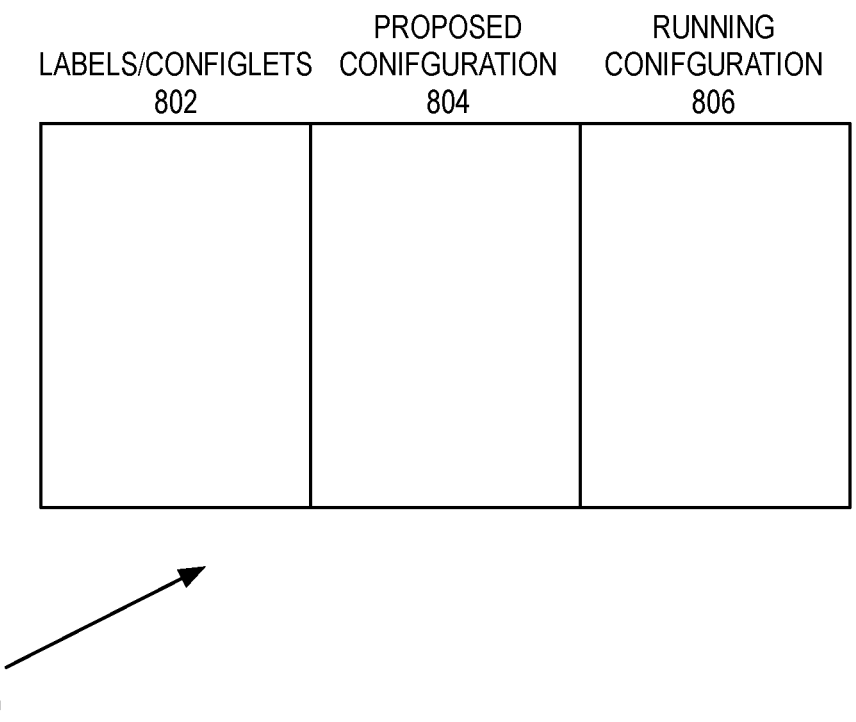
FIG. 8 is an illustration of a user interface for configuring network elements using labels and configlets.

FIG. 8 is an illustration of a user interface 800 for configuring network element(s) using labels and configlets. While in one embodiment, the user interface 800 displays information for one network element at a time, in alternate embodiments, the user interface 800 displays information for multiple network elements that have the same set of labels and associated configlets. In FIG. 8, the user interface 800 includes user interface panels for the labels and configlets of the network element(s) 802, the proposed configuration panel of the network element(s) 804, and the running configuration panel of the network element 806. In one embodiment, the labels and configlets panel 802 displays the labels and associated configlets for these network element(s). In one embodiment, the proposed configuration panel 804 displays the assembled configuration for the network element(s). In this embodiment, a user may review and further edit the proposed configuration. If the user edits this configuration, the edited configuration is saved and used for these network element(s). In one embodiment, the running configuration of the network element(s) is displayed in running configuration panel 806. In this panel 806, the user can view the actual running configuration of the network element.

Figure 9:
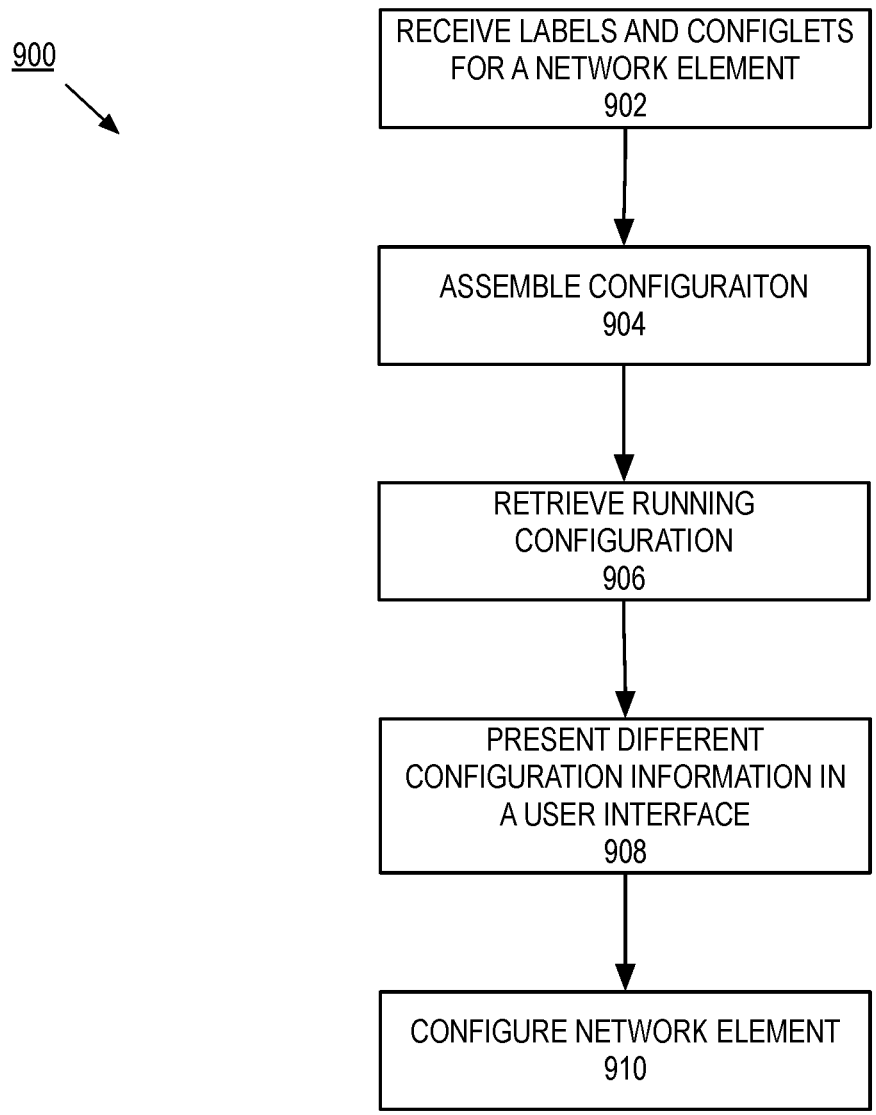
FIG. 9 is a flow diagram of one embodiment of a process to present different configuration information in a user interface.

FIG. 9 is a flow diagram of one embodiment of a process 900 to present different configuration information in a user interface. In one embodiment, process 900 is performed by an automation controller, such as the automation controller 104 as described in FIG. 1 above. In FIG. 9, process 900 begins by receiving the labels and configlets for a network element at block 902. In one embodiment, this network element may have one or more labels and one or more configlets associated with the network element. At block 904, process 900 assembles the configuration using the configlets of the network element. In one embodiment, process 900 assembles configuration as described in FIG. 6 above. Process 900 retrieves the running configuration of the network element at block 906. In one embodiment, the running configuration is the current configuration of the network element and may or may not be the same as the assembled configuration derived from configlets in block 904.

At block 908, process 900 presents the labels and configlets, the assembled configuration, and the running configuration in a user interface. In one embodiment, the user interface is the user interface 800 described in FIG. 8 above. In one embodiment, process 900 assembles a set of web pages that are transmitted to a client. In another embodiment, process 900 can receive and integrate edits to the assembled configuration as described in FIG. 5 above. Process 900 configures the network element using the assembled configuration at block 910. In one embodiment, process 900 configures the network element as described in FIG. 5, block 518 above.

Figure 10:
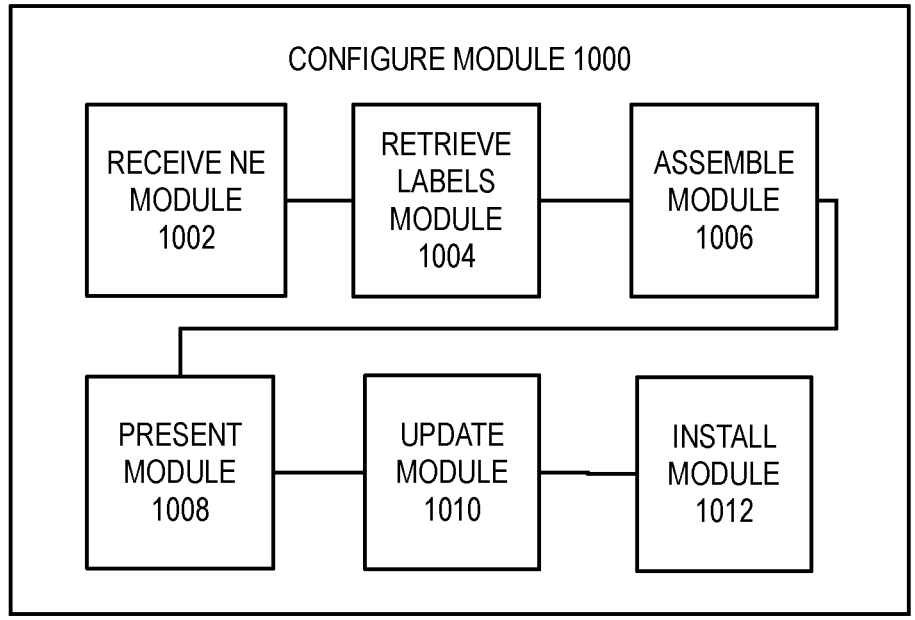
FIG. 10 is a block diagram of one embodiment of a configure module that configures network elements using labels and configlets.

FIG. 10 is a block diagram of one embodiment of a configure module 1000 that configures network elements using labels and configlets. In one embodiment, the configure module 1000 includes receive network elements module 1002, retrieve labels module 1004, assemble module 1006, present module 1008, update module 1010, and install module 1012. In one embodiment, receive network elements module 1002 receives the set of network elements to configure as described in FIG. 5, block 502. The retrieve labels module 1004 retrieves the set of labels for a set of network elements as described in FIG. 5, block 504. The assemble module 1006 assembles the configuration as described in FIG. 5, block 506. The present module 1008 the configuration information as described in FIG. 5, block 510. The update module 1010 updates a configuration as described in FIG. 5, block 514. The install module 1012 installs the configuration for the network elements as described in FIG. 5, block 518.

Figure 11:
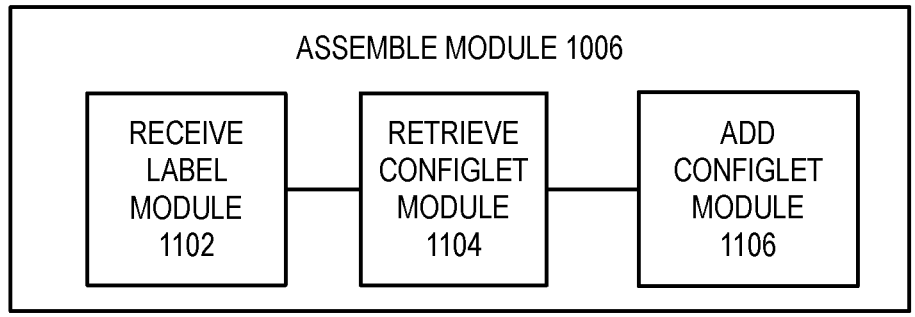
FIG. 11 is a block diagram of one embodiment of an assemble module that assemble a configuration from a set of labels and the configlets for each of those labels.

FIG. 11 is a block diagram of one embodiment of an assemble module 1006 that assemble a configuration from a set of labels and the configlets for each of those labels. In one embodiment, the assemble module 1006 includes receive label module 1102, retrieve configlet module 1104, and add configlet module 1106. In one embodiment, receive label module 1102 receives the set of labels as described in FIG. 6, block 602 above. The retrieve configlet module 1104 retrieves the configlet for this label as described in FIG. 6, block 606 above. The add configlet module 1106 adds the configlet to the configuration as described in FIG. 6, block 608 above.

Figure 12:
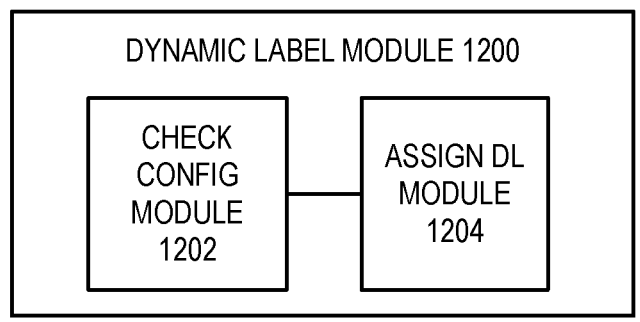
FIG. 12 is a block diagram of one embodiment of a dynamic label module that assigns dynamic labels for a network element based on a current configuration that network element.

FIG. 12 is a block diagram of one embodiment of a dynamic label module 1200 that assigns dynamic labels for a network element based on a current configuration that network element. In one embodiment, the dynamic label module 1200 includes check configuration module 1202 and assign dynamic label module 1204. In one embodiment, the check configuration module 1202 checks the configuration for a possible dynamic label assignment as described in FIG. 7, block 702 above. The assign dynamic label module 1204 assigns the dynamic label as described in FIG. 7, block 704 above.

Figure 13:
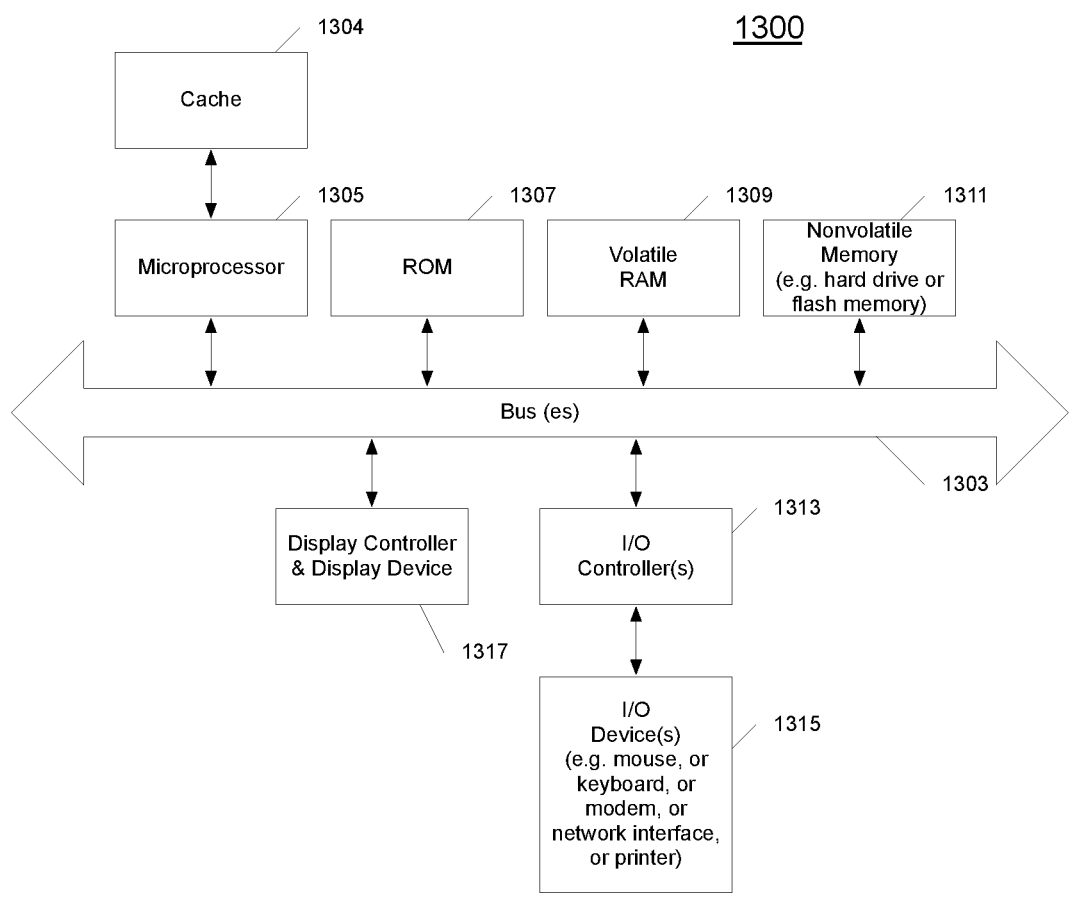
FIG. 13 illustrates one example of a typical computer system, which may be used in conjunction with the embodiments described herein.

FIG. 13 shows one example of a data processing system 1300, which may be used with one embodiment of the present invention. For example, the system 1300 may be implemented including an automation controller 104 as shown in FIG. 1. Note that while FIG. 13 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 13, the computer system 1300, which is a form of a data processing system, includes a bus 1303 which is coupled to a microprocessor(s) 1305 and a ROM (Read Only Memory) 1307 and volatile RAM 1309 and a non-volatile memory 1311. The microprocessor 1305 may retrieve the instructions from the memories 1307, 1309, 1311 and execute the instructions to perform operations described above. The bus 1303 interconnects these various components together and also interconnects these components 1305, 1307, 1309, and 1311 to a display controller and display device 1317 and to peripheral devices such as input/output (I/O) devices which may be mice, keyboards, modems, network interfaces, printers and other devices which are well known in the art. In one embodiment, the system 1300 includes a plurality of network interfaces of the same or different type (e.g., Ethernet copper interface, Ethernet fiber interfaces, wireless, and/or other types of network interfaces). In this embodiment, the system 1300 can include a forwarding engine to forward network data received on one interface out another interface.

Typically, the input/output devices 1315 are coupled to the system through input/output controllers 1313. The volatile RAM (Random Access Memory) 1309 is typically implemented as dynamic RAM (DRAM), which requires power continually in order to refresh or maintain the data in the memory.

The mass storage 1311 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1311 will also be a random access memory although this is not required. While FIG. 11 shows that the mass storage 1311 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1303 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "assembling," "configuring," "presenting," "adding," "sending," "retrieving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to set up a plurality of network elements, the method comprising:

receiving a plurality of labels for each network element of the plurality of network elements, wherein each of the plurality of labels is associated with a different configlet of a plurality of configlets and each configlet of the plurality of configlets includes a configuration command;

assembling, for each network element of the plurality of network elements, a complete network element configuration from the configuration commands of the plurality of configlets associated with the plurality of labels received for that network element; and setting up each of the plurality of network elements using the complete network element configuration assembled for that network element.

2. The non-transitory machine-readable medium of claim 1, wherein each of the plurality of labels comprises an identifier.

3. The non-transitory machine-readable medium of claim 1, wherein the method further comprises:

presenting a plurality of separate groups of configuration settings.

4. The non-transitory machine-readable medium of claim 1, wherein the method further comprises:

receiving a change to a first group of configuration settings and incorporating the change to the first group of configuration settings.

5. The non-transitory machine-readable medium of claim 1, wherein one of the plurality of network elements has multiple labels associated with that network element and the method further comprises:

adding each of the plurality of configlets to a corresponding group of configuration settings for that network element.

6. The non-transitory machine-readable medium of claim 1, wherein each of the plurality of labels is selected from a group comprising a static label, hierarchical label, and dynamic label.

7. The non-transitory machine-readable medium of claim 6, wherein one label of the plurality of labels for one network element of the plurality of network elements is the hierarchical label and the assembling of the complete network element configuration further comprises:

grouping the plurality of configlets into a plurality of separate group of configuration settings; and for each container of the hierarchical label, adding a configlet associated with that container to the corresponding separate group of configuration settings for that network element.

8. A method to set up a plurality of network elements, the method comprising:

receiving, by a controller, a plurality of labels for each network element of the plurality of network elements, wherein each of the plurality of labels is associated with a different configlet of a plurality of configlets and each configlet of the plurality of configlets includes a configuration command;

assembling, by the controller, for each network element of the plurality of network elements, a complete network element configuration from the configuration commands of the plurality of configlets associated with the plurality of labels received for that network element; and setting up, by the controller, each of the plurality of network elements using the complete network element configuration assembled for that network element.

9. The method of claim 8, wherein each of the plurality of labels comprises an identifier.

10. The method of claim 8, wherein each of the plurality of network elements includes a same group of labels.

11. The method of claim 8, wherein the method further comprises: presenting a plurality of separate groups of configuration settings.

12. The method of claim 8, wherein the method further comprises:

receiving a change to a first group of configuration settings and incorporating the change to the first group of configuration settings.

13. The method of claim 8, wherein one network element of the plurality of network elements has multiple labels associated with that network element and the method further comprises:

adding each of the plurality of configlets to a corresponding group of configuration settings for that network element.

14. The method of claim 8, wherein each of the plurality of labels is a static label, a hierarchical label, or a dynamic label.

15. The method of claim 8, wherein one label of the plurality of labels for one network element of the plurality of network elements is a hierarchical label and the assembling of the complete network element configuration further comprises:

grouping the plurality of configlets into a separate group of configuration settings; and for each container of the hierarchical label, adding a configlet associated with that container to the corresponding separate group of configuration settings for that network element.

\* \* \* \* \*